(12) United States Patent
Ienaga

(10) Patent No.: US 10,358,137 B2
(45) Date of Patent: Jul. 23, 2019

(54) VEHICLE CONTROL DEVICE AND VEHICLE CONTROL METHOD

(71) Applicant: FUJI JUKOGYO KABUSHIKI KAISHA, Tokyo (JP)

(72) Inventor: Hiroshi Ienaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 247 days.

(21) Appl. No.: 15/392,535

(22) Filed: Dec. 28, 2016

(65) Prior Publication Data
US 2017/0247035 A1    Aug. 31, 2017

(30) Foreign Application Priority Data

Feb. 29, 2016 (JP) ................. 2016-038097

(51) Int. Cl.
| | | |
|---|---|---|
| *B60W 10/08* | (2006.01) | |
| *B60W 50/00* | (2006.01) | |
| *B60K 7/00* | (2006.01) | |
| *B60W 30/20* | (2006.01) | |
| *B60K 17/356* | (2006.01) | |

(Continued)

(52) U.S. Cl.
CPC ........... *B60W 30/20* (2013.01); *B60K 7/0007* (2013.01); *B60K 17/356* (2013.01); *B60K 28/16* (2013.01); *B60W 10/08* (2013.01); *B60W 10/10* (2013.01); *B60W 10/119* (2013.01); *B60W 30/18172* (2013.01); *B60W 50/0098* (2013.01); *B60K 2007/0061* (2013.01); *B60K 2007/0092* (2013.01); *B60W 2050/0008* (2013.01); *B60W 2510/081* (2013.01); *B60W 2520/26* (2013.01); *B60W 2520/28* (2013.01);

(Continued)

(58) Field of Classification Search
CPC . B60W 10/08; B60W 2050/0008; B60K 7/00; B60K 7/0038
See application file for complete search history.

(56) References Cited

U.S. PATENT DOCUMENTS

| | | | | |
|---|---|---|---|---|
| 6,806,667 B1 * | 10/2004 | Sasaki | .................... | B60K 6/365 180/170 |
| 2012/0059544 A1 * | 3/2012 | Kinoshita | .......... | B60G 17/0164 701/22 |

(Continued)

FOREIGN PATENT DOCUMENTS

| | | |
|---|---|---|
| JP | 08-182119 A | 7/1996 |
| JP | 2003-065135 A | 3/2003 |

(Continued)

OTHER PUBLICATIONS

Office Action for Japanese Patent application No. 2016-038097, dated Aug. 29, 2017, 4 pages of office action and 4 pages of English translation.

*Primary Examiner* — Tisha D Lewis
(74) *Attorney, Agent, or Firm* — Chip Law Group

(57) ABSTRACT

A vehicle control device includes: a requested torque acquisition module that acquires a requested torque requested to a motor that drives a wheel; a control subject designation module that designates one of a wheel speed and a motor rotation speed as a control subject on the basis of the requested torque; and a control module that performs feedback control in a manner that the control subject designated by the control subject designation module becomes equal to a target value.

15 Claims, 10 Drawing Sheets

(51) Int. Cl.
*B60W 10/10* (2012.01)
*B60W 10/119* (2012.01)
*B60W 30/18* (2012.01)
*B60K 28/16* (2006.01)

(52) U.S. Cl.
CPC ..... *B60W 2540/10* (2013.01); *B60W 2720/28* (2013.01); *Y02T 10/7258* (2013.01)

(56) References Cited

U.S. PATENT DOCUMENTS

| | | | |
|---|---|---|---|
| 2015/0012160 A1* | 1/2015 | Tsutsumi | B60L 15/20 701/22 |
| 2015/0210268 A1* | 7/2015 | Yang | B60K 6/387 74/661 |
| 2015/0360693 A1 | 12/2015 | Ienaga | |
| 2018/0154797 A1* | 6/2018 | Sawada | B60L 15/20 |

FOREIGN PATENT DOCUMENTS

| | | |
|---|---|---|
| JP | 2006-136174 A | 5/2006 |
| JP | 2007-244094 A | 9/2007 |
| JP | 2016-005328 A | 1/2016 |

\* cited by examiner

FIG. 3

| REQUESTED TORQUE | | CONTROL INFORMATION | |
|---|---|---|---|
| | | WHEEL SPEED | MOTOR ROTATION SPEED |
| HIGH | | ADVANTAGE: VIBRATION BECOMES SMALL EVEN WHEN DISTURBANCE IS INPUT. | ADVANTAGE: RAPID RESPONSE CAN BE OBTAINED AND IT IS POSSIBLE TO SUPPRESS SLIP. |
| | | DISADVANTAGE: RESPONSE SPEED BECOMES SLOW, AND SLIP CANNOT BE SUPPRESSED. | ADVANTAGE: VIBRATION BECOMES SMALL DUE TO MOTOR TORQUE EVEN WHEN DISTURBANCE IS INPUT. |
| LOW | | ADVANTAGE: VIBRATION BECOMES SMALL EVEN WHEN DISTURBANCE IS INPUT. | ADVANTAGE: RAPID RESPONSE CAN BE OBTAINED AND IT IS POSSIBLE TO SUPPRESS SLIP. |
| | | ADVANTAGE: AMOUNT OF SLIP IS SMALL, AND IT IS POSSIBLE TO SUPPRESS SLIP EVEN IN CASE WHERE RESPONSE SPEED IS SLOW. | DISADVANTAGE: VIBRATION DUE TO TORSION OF DRIVE SHAFT OCCURS WHEN DISTURBANCE IS INPUT. |

VEHICLE CONTROL DEVICE AND VEHICLE CONTROL METHOD

CROSS-REFERENCE TO RELATED APPLICATIONS

The present application claims priority from Japanese Patent Application No. 2016-038097 filed on Feb. 29, 2016, the entire contents of which are hereby incorporated by reference.

BACKGROUND

1. Technical Field

The present invention relates to vehicle control devices and vehicle control methods.

2. Related Art

For example, as described in Japanese Unexamined Patent Application Publication No. H08-182119, control methods for controlling a slip by using a motor rotation speed are known in the related art.

To secure slip suppression performance, it is desirable to control a slip by using a motor rotation speed with high responsiveness to the slip. However, in the case where the motor rotation speed is used for controlling a slip of an electric car equipped with motors, motor rotation vibrates and a slip is erroneously determined when disturbance due to road surface textures is input to a tire as a consequence of torsion of a drive shaft that couples a motor with a wheel. As a result, a torque is rapidly decreased although a slip does not occur, self-oscillation occurs, and control may diverge, unfortunately.

SUMMARY OF THE INVENTION

Accordingly, it is desirable to provide a novel and improved vehicle control device and vehicle control method that are capable of suppressing vibration in a motor rotation speed and improving responsiveness of slip suppression in the case where disturbance is input.

An aspect of the present invention provides a vehicle control device including: a requested torque acquisition module that acquires a requested torque requested to a motor that drives a wheel; a control subject designation module that designates one of a wheel speed and a motor rotation speed as a control subject on the basis of the requested torque; and a control module that performs feedback control in a manner that the control subject designated by the control subject designation module becomes equal to a target value.

The control subject designation module may designate the motor rotation speed as the control subject in a case where the requested torque is a predetermined threshold or more, and the control subject designation module may designate the wheel speed as the control subject in a case where the requested torque is less than the threshold.

The vehicle control device may include a slip determination module that determines a slip of a wheel on the basis of a comparison result between the target value and the control subject designated by the control subject designation module. The control module may perform the feedback control in a case where the slip determination module determines that a slip is occurring.

While the slip determination module is determining that a slip is occurring, the control module does not have to switch the control subject in accordance with designation by the control subject designation module.

The control module may perform the feedback control on the basis of a control gain according to the control subject designated by the control subject designation module.

The control module may calculate a torque down amount of the motor so as to make the control subject designated by the control subject designation module equal to a target value. The vehicle control device may include a torque limiting module that limits the torque down amount on the basis of a requested torque.

The torque limiting module may limit the torque down amount in a manner that the torque down amount becomes smaller as the requested torque decreases.

The torque limiting module may set the torque down amount to a constant value regardless of the requested torque in a case where the requested torque is a predetermined value or less.

Another aspect of the present invention provides a vehicle control method including: acquiring a requested torque requested by a driver; designating one of a wheel speed and a motor rotation speed as a control subject on the basis of the requested torque; and performing feedback control in a manner that the designated control subject becomes equal to a target value.

BRIEF DESCRIPTION OF THE DRAWINGS

FIG. 3 is a schematic diagram illustrating characteristics in the case where feedback control is performed on a wheel speed set as a control subject, and in the case where feedback control is performed on a motor rotation speed set as a control subject;

DETAILED DESCRIPTION

Figure 1:
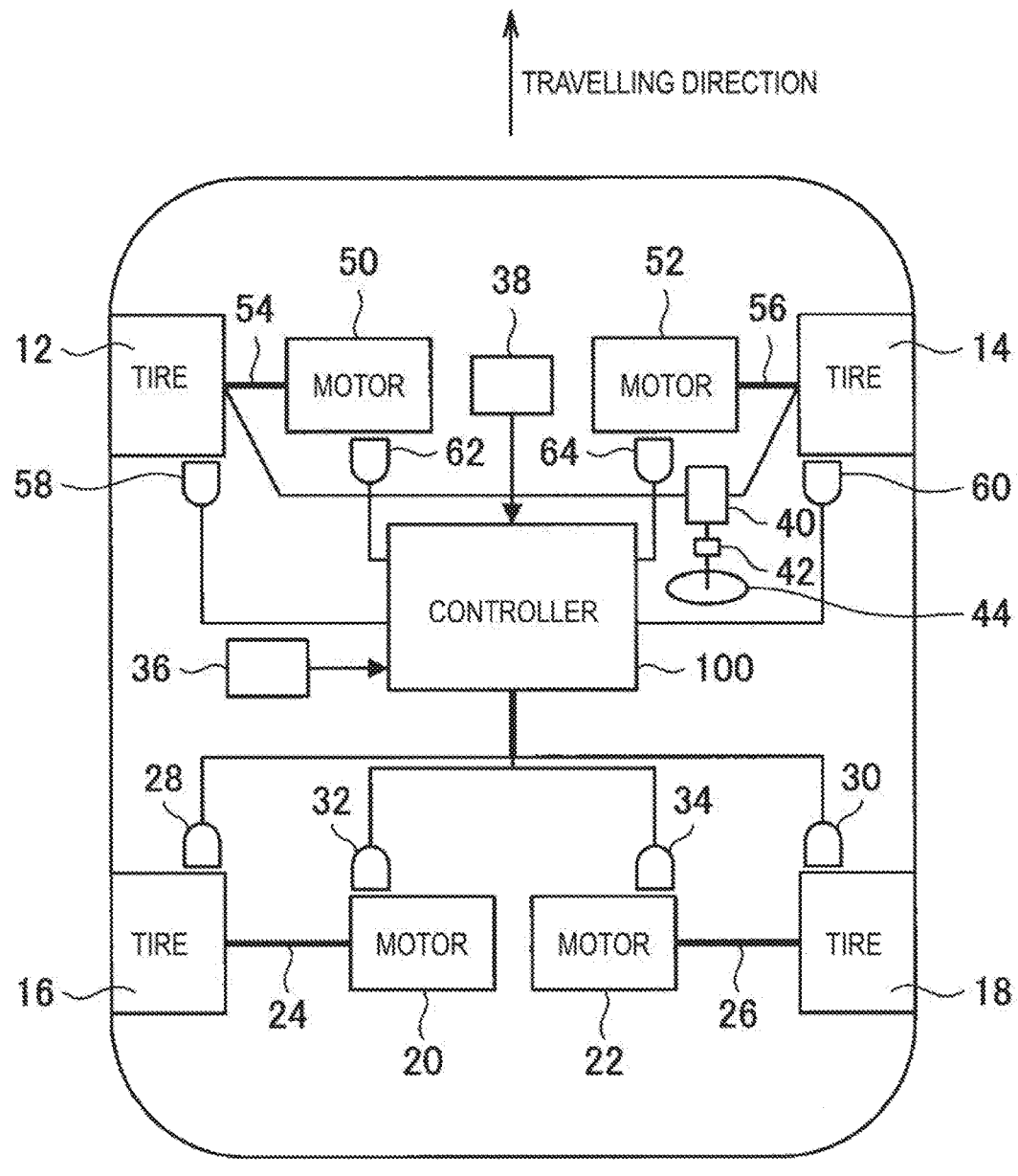
FIG. 1 is a schematic diagram illustrating a configuration of a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

First, with reference to FIG. 1, the configuration of a vehicle 500 according to an implementation of the present invention will be described. FIG. 1 is a schematic diagram illustrating the configuration of the vehicle 500 according to the implementation of the present invention. As illustrated in FIG. 1, the vehicle 500 includes four tires (wheels) 12, 14, 16 and 18 including front and rear wheels, a vehicle control device (controller) 100, two motors (drive units) 20 and 22 that control the rotation of the respective rear wheel tires 16 and 18, drive shafts 24 and 26 that couple the respective motors 20 and 22 to the respective tires 16 and 18, deceleration mechanisms (not illustrated) that decelerate the rotation of the respective motors 20 and 22 and transmits the decelerated rotation to the drive shafts 24 and 26, wheel speed sensors 28 and 30 that detect wheel speeds of the respective rear wheel tires 16 and 18 from the rotation thereof, motor rotation speed sensors 32 and 34 that detect rotation speeds of the respective motors 20 and 22, an acceleration sensor 36, and a yaw rate sensor 38. The vehicle 500 further includes, as in the rear wheel part, two motors (drive units) 50 and 52 that control the rotation of the respective front wheel tires 12 and 14, drive shafts 54 and 56 that couple the respective motors 50 and 52 to the respective tires 12 and 14, wheel speed sensors 58 and 60 that detect wheel speeds of the respective front wheel tires 12 and 14 from the rotation thereof, and motor rotation speed sensors 62 and 64 that detect rotation speeds of the respective motors of the front wheels. The wheel speed sensors of the respective wheels detect tire rotation speeds (wheel speeds) N_wheel (FL, FR, RL, RR) of the respective wheels. The motor rotation speed sensors of the respective wheels detect motor rotation speeds N_motor (FL, FR, RL, RR) of the respective wheels. The vehicle 500 further includes a power steering mechanism (P/S) 40, a steering angle sensor 42, and a steering wheel 44 that operates steering angles of the respective front wheel tires 12 and 14. The vehicle 500 is configured as an electric vehicle that independently drives the four tires (12, 14, 16, and 18).

Figure 2:
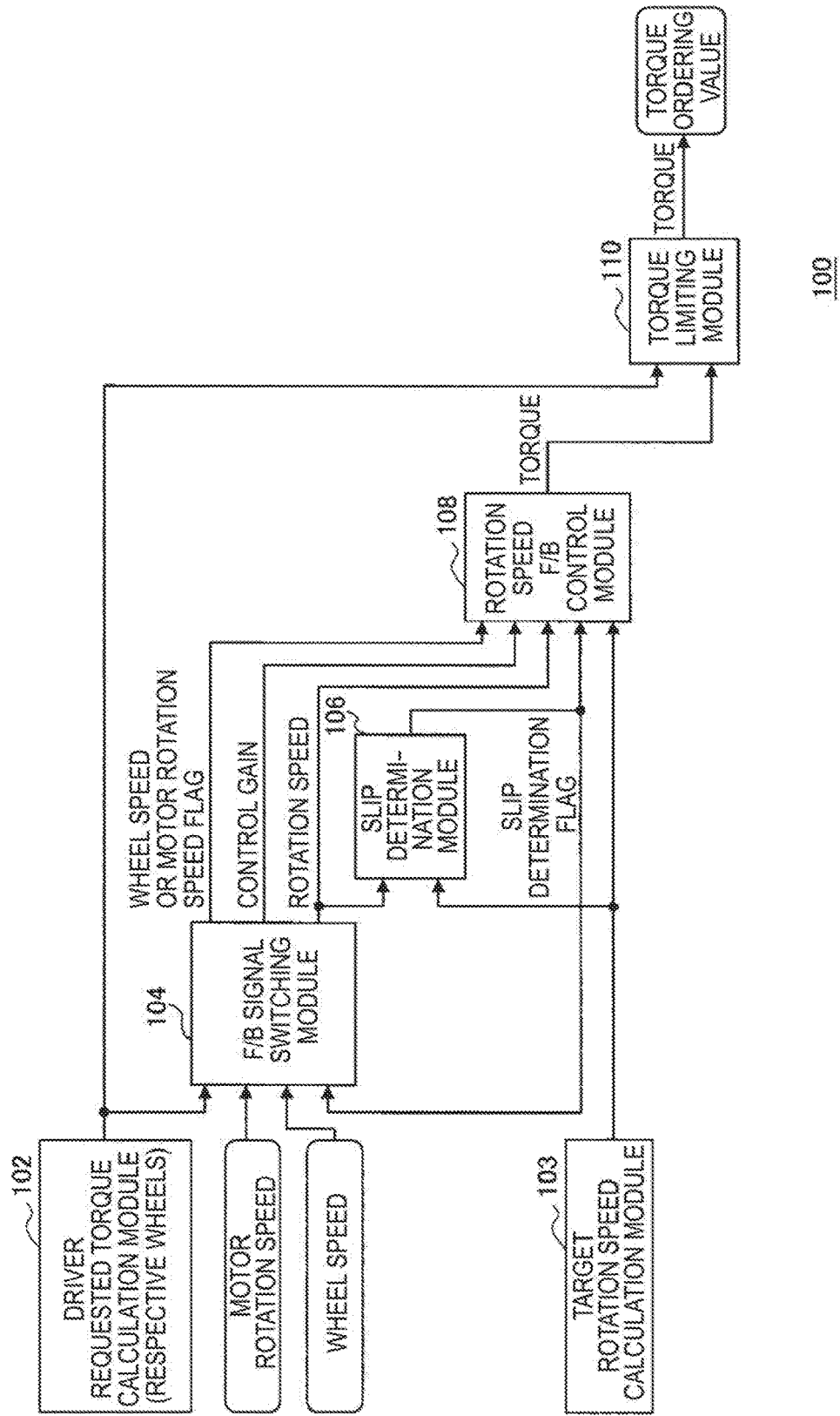
FIG. 2 is a schematic diagram illustrating a main configuration of a vehicle control device 100 according to the implementation.

FIG. 2 is a schematic diagram illustrating a main configuration of the vehicle control device 100 according to the implementation. As illustrated in FIG. 2, the control device 100 includes a driver requested torque calculation module 102, a target rotation speed calculation module 103, a feedback (F/B) signal switching module 104, a slip determination module 106, a rotation speed feedback (F/B) control module 108, and a torque limiting module 110. Such structural elements in FIG. 2 can be configured by a circuit (hardware) or a central processing unit such as a CPU and a program (software) for causing it to function. In one implementation of the present invention, the driver requested torque calculation module 102 and the feedback (F/B) signal switching module 104 may serve as a "requested torque acquisition module" and a "control subject designation module".

The driver requested torque calculation module 102 calculates requested torques to respective tires 12, 14, 16, and 18 on the basis of an accelerator position or the like. The requested torque to the respective tires 12, 14, 16, and 18 are input to the feedback (F/B) signal switching module 104 and the torque limiting module 110. The feedback (F/B) signal switching module 104 receives motor rotation speeds N_motor (FL, FR, RL, RR) of the respective wheels and tire rotation speeds (wheel speeds) N_wheel (FL, FR, RL, RR) of the respective wheels.

The target rotation speed calculation module 103 calculates target rotation speeds of the respective wheels by multiplying a vehicle speed (calculated value or estimated value) by any slip ratio. The slip ratio is decided by conformity. The calculated target rotation speeds are input to the slip determination module 106 and the rotation speed feedback (F/B) control module 108.

The feedback (F/B) signal switching module 104 switches a rotation speed used for rotation speed feedback control in accordance with a requested torque. In other words, the feedback (F/B) signal switching module 104 switches the motor rotation speeds N_motor (FL, FR, RL, RR) and the tire rotation speeds (wheel speeds) N_wheel (FL, FR, RL, RR) in accordance with requested torques, and designates (selects) the motor rotation speeds or the tire rotation speeds as a control subject.

In the case where the slip determination module 106 determines that a tire is slipping, the rotation speed feedback (F/B) control module 108 performs slip control (rotation speed F/B control) on the respective wheels on the basis of rotation speeds designated as a control subject by the feedback (F/B) signal switching module 104, in a manner that the rotation speeds become equal to a target rotation speed. Therefore, the feedback (F/B) signal switching module 104 transmits a switching flag to the rotation speed feedback (F/B) control module 108. The switching flag indicates a result of switching the rotation speeds. In accordance with the result of switching the rotation speeds, the feedback (F/B) signal switching module 104 transmits the wheel speeds or the motor rotation speeds designated as the control subject to the slip determination module 106 and the rotation speed feedback (F/B) control module 108.

In accordance with the result of switching the rotation speeds, the feedback (F/B) signal switching module 104 transmits the wheel speeds or the motor rotation speeds designated as the control subject to the slip determination module 106.

The feedback (F/B) signal switching module 104 calculates a control gain in the case where the wheel speeds are set as the control subject and a control gain in the case where the motor rotation speeds are set as the control subject, and transmits the control gain to the rotation speed feedback (F/B) control module 108.

Here, in accordance with a level of the requested torque, there are characteristics as illustrated in FIG. 3 in the case where feedback control is performed on the wheel speeds set as the control subject, and in the case where feedback control is performed on the motor rotation speeds set as the control subject.

When the motor rotation speeds are set as the control subject in the case where the requested torque is high, it is possible to directly control the motors without using the drive shafts, and thereby a rapid response can be obtained and it is possible to surely suppress a slip. In addition, in the case where the requested torque is high, motor torques also become high. This makes it less likely to be affected by disturbance input from the wheels, and vibration becomes small even when the disturbance is input.

On the other hand, when the motor rotation speeds are set as the control subject in the case where the requested torque is low, it is possible to effectively suppress a slip because a rapid response can be obtained in a way similar to the case of the high requested torque. However, this makes it likely to be affected by disturbance input from the wheels and vibration due to torsion of the drive shaft occurs when the disturbance is input. Accordingly, although actually a slip does not occur, it is erroneously determined that a slip is occurring and slip control starts. In this case, motor torque variation occurs for suppressing the slip in a state in which no slip is occurring (grip state). Therefore, self-oscillation occurs in the motor and vibration diverges.

When the wheel speeds are set as the control subject in the case where the requested torque is high, the vibration due to torsion of the drive shaft has little effect on the wheel speeds, and it is possible to reduce erroneous slip determination when the disturbance is input, for example. However, rotation of the motors is transmitted to the respective tires via the drive shafts. Therefore, response speeds become slow, and sometimes a slip cannot be suppressed sufficiently.

On the other hand, when the wheel speeds are set as the control subject in the case where the requested torque is low, the vibration due to torsion of the drive shaft has little effect on the wheel speeds in a way similar to the case of the high requested torque, and it is possible to reduce erroneous slip determination when the disturbance is input, for example. In addition, when the wheel speeds are set as the control subject in the case where the requested torque is low, rotation of the motors is transmitted to the respective tires via the drive shafts. Therefore, response speeds become slow. However, an amount of the slip is small in the case of the low requested torque, and it is possible to suppress the slip even in the case where the response speeds is slow.

In addition, in the case where the wheel speeds are set as the control subject, vibration at the time of disturbance input becomes small. Therefore, a torque down amount at the time of erroneous slip determination becomes smaller than the case where the motor rotation speeds are set as the control subject. Accordingly, it is possible to suppress control divergence and feeling of strangeness of a driver.

Therefore, in accordance with the requested torques, the rotation speed feedback (F/B) control module 108 performs slip control on the basis of the tire rotation speeds (wheel speeds) N_wheel (FL, FR, RL, RR) at the time of low requested torque. On the other hand, at the time of high requested torque, the rotation speed feedback (F/B) control module 108 performs slip control on the basis of the motor rotation speeds N_motor (FL, FR, RL, RR). Therefore, in accordance with the requested torques, the feedback (F/B) signal switching module 104 designates the tire rotation speeds (wheel speeds) N_wheel (FL, FR, RL, RR) as the control subject at the time of low requested torque, and designates the motor rotation speeds N_motor (FL, FR, RL, RR) as the control subject at the time of high requested torque. Subsequently, the feedback (F/B) signal switching module 104 transmits the designated control subject to the slip determination module 106 and the rotation speed feedback (F/B) control module 108.

Figure 4:
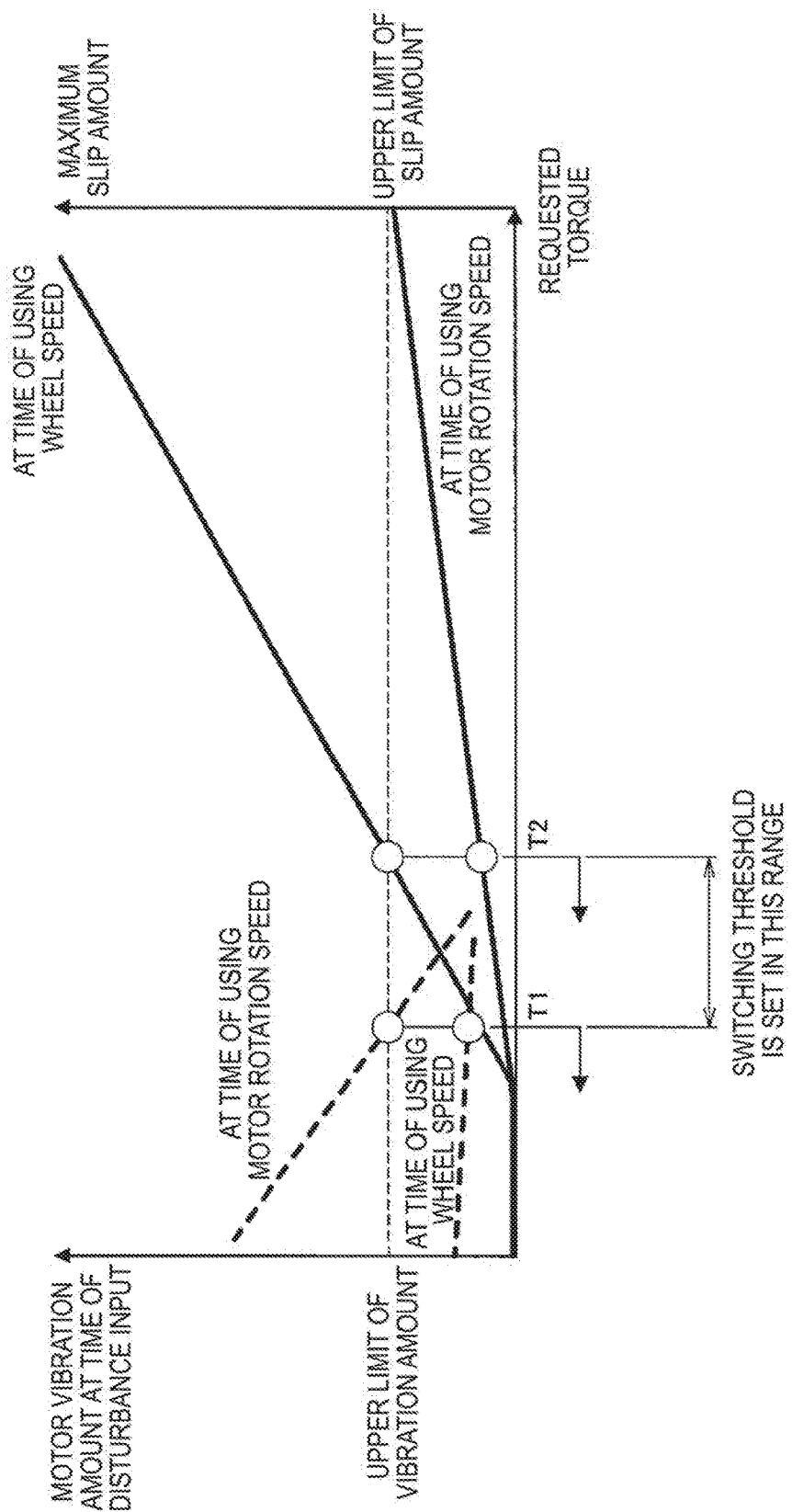
FIG. 4 is a schematic diagram illustrating how a feedback (F/B) signal switching module switches a rotation speed set as a control subject.

FIG. 4 is a schematic diagram illustrating how the feedback (F/B) signal switching module 104 switches the rotation speeds set as the control subject. In FIG. 4, a horizontal axis represents a requested torque, and a vertical axis represents a motor vibration amount (left vertical axis) and a maximum slip amount (right vertical axis) at a time of disturbance input. In FIG. 4, solid lines represents slip amounts of a tire (at the time of using the wheel speeds and at the time of using the motor rotation speeds), and dotted lines represents motor vibration amounts at the time of disturbance input (at the time of using the wheel speeds and at the time of using the motor rotation speeds). In addition, FIG. 4 illustrates upper limits of the motor vibration amount and the slip amount.

When the motor rotation speed is used as the control subject in the case where the requested torque is T1 or less as illustrated in FIG. 4, a motor vibration amount exceeds the upper limit. Therefore, it is necessary to use the wheel speed to suppress the motor vibration. When the wheel speed is used as the control subject in the case where the requested torque is larger than T1, a slip amount exceeds the upper limit. Therefore, it is necessary to use the motor rotation speed to suppress the slip amount. In view of the slip amount, the wheel speed can be used until the requested torque reaches T2.

Accordingly, the feedback (F/B) signal switching module 104 switches the motor rotation speed and the wheel speed in a manner that the wheel speed is used when the requested torque is T1 or less, and the motor rotation speed is used when the requested torque is larger than T2. Subsequently, the feedback (F/B) signal switching module 104 sets a switching threshold in a range in which the requested torque is larger than T1 and T2 or less. When the requested torque becomes the switching threshold or more, the feedback (F/B) signal switching module 104 switches the control subject from the wheel speed to the motor rotation speed.

By performing feedback control while setting the wheel speed as the control subject at the time of low requested torque, it is possible to reduce motor vibration at the time of disturbance input and suppress a slip. On the other hand, by performing feedback control while setting the motor rotation speed as the control subject at the time of high requested torque, it is possible to speed up a response, surely suppress a slip, and reduce motor vibration at the time of disturbance input.

The slip determination module 106 determines whether each of the wheels is slipping from a difference between the target rotation speed transmitted from the target rotation speed calculation module 103 and a rotation speed (wheel speed or motor rotation speed) of the control subject transmitted from the feedback (F/B) signal switching module 104. In the case where the difference between the target rotation speed and the rotation speed of the control subject exceeds a predetermined threshold, the slip determination module 106 determines that a slip is occurring, and transmits a slip determination flag to the feedback (F/B) signal switching module 104 and the rotation speed feedback (F/B) control module 108. The slip determination flag indicates a result of the determination.

Thereby, the rotation speed feedback (F/B) control module 108 performs slip control (rotation speed F/B control) in the case where it is determined that a slip is occurring on the basis of the slip determination flag. The slip control can be performed on each wheel that is slipping.

Figure 5:
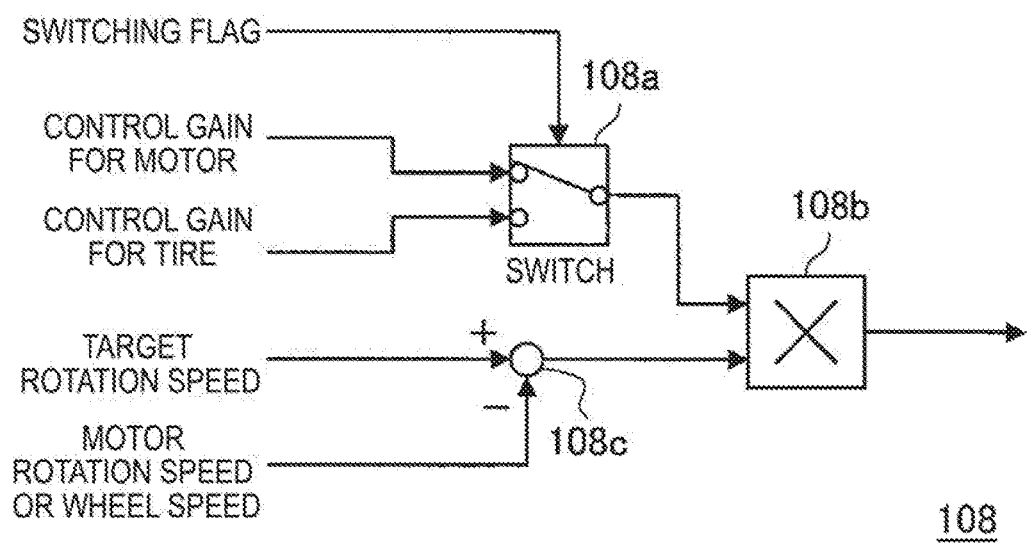
FIG. 5 is a schematic diagram illustrating a configuration of a rotation speed feedback (F/B) control module that switches a control gain for performing feedback control on a rotation speed set as a control subject.

As described above, the rotation speed feedback (F/B) control module 108 receives the control gain in the case where the wheel speeds are set as the control subject, and the control gain in the case where the motor rotation speeds are set as the control subject. FIG. 5 is a schematic diagram illustrating a configuration of the rotation speed feedback (F/B) control module 108 that switches the control gain for performing feedback control on the rotation speed set as the control subject. As illustrated in FIG. 5, the rotation speed feedback (F/B) control module 108 includes a switch 108a, a multiplication module 108b, and a subtraction module 108c.

According to the configuration illustrated in FIG. 5, the switch 108a receives a switching flag from the feedback (F/B) signal switching module 104. In addition, the switch 108a receives the control gain for the motor rotation speed and the control gain for the wheel speed from the feedback (F/B) signal switching module 104. In the case where the control subject is the motor rotation speed, the switch 108a outputs the control gain for the motor rotation speed to the multiplication module 108b on the basis of the switching flag. In the case where the control subject is the wheel speed, the switch 108a outputs the control gain for the wheel speed to the multiplication module 108b on the basis of the switching flag.

The subtraction module 108c subtracts the rotation speed (motor rotation speed or wheel speed) transmitted as the control subject by the feedback (F/B) signal switching module 104, from the target rotation speed transmitted by the target rotation speed calculation module 103, and outputs a result of the subtraction to the multiplication module 108b.

The multiplication module 108b multiplies the control gain transmitted from the switch 108a by the result of subtraction transmitted from the subtraction module 108c. The rotation speed feedback (F/B) control module 108 performs feedback control on the rotation speed by using PI control on the basis of a result of the multiplication performed by the multiplication module 108b. Specifically, the rotation speed feedback (F/B) control module 108 calculates a torque down amount to be subtracted from the requested torque T_req_1 (FL) so that the rotation speed of the control subject becomes equal to the target rotation speed, and transmits the calculated torque down amount to the torque limiting module 110. The rotation speed feedback (F/B) control module 108 performs PID control using the target rotation speed and the rotation speed of the control subject, and finds the torque down amount by which the rotation speed of the control subject becomes equal to the target rotation speed. A gain of the PID control is decided by conformity.

Figure 6:
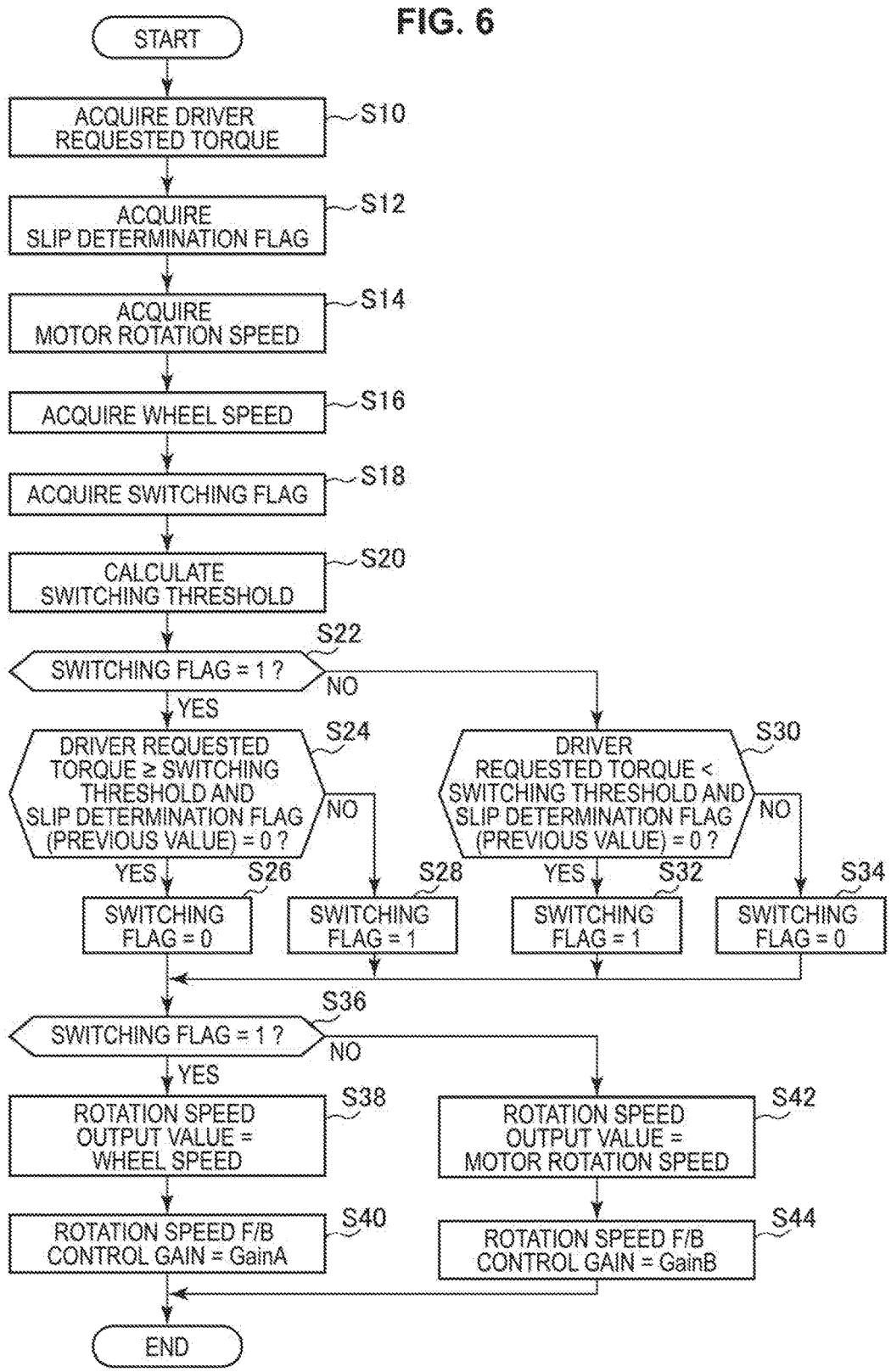
FIG. 6 is a flowchart illustrating a process performed in a feedback (F/B) signal switching module, a slip determination module, and a rotation speed F/B control module.

FIG. 6 is a flowchart illustrating a process performed in the feedback (F/B) signal switching module 104, the slip determination module 106, and the rotation speed F/B control module 108. First, in Step S10, a driver requested torque is acquired. In the next Step S12, a slip determination flag is acquired. In the next Step S14, a motor rotation speed is acquired. In the next Step S16, a wheel speed is acquired.

In the next Step S18, a switching flag indicating a result of switching the rotation speed is acquired. The switching flag is set to "0" in the case where the control subject is the motor rotation speed, and the switching flag is set to "1" in the case where the control subject is the wheel speed (Steps S26, S28, S32, and S34). In the next Step S20, a switching threshold for switching the motor rotation speed and the wheel speed is calculated on the basis of the requested torque. Alternatively, a predetermined value may be acquired as the switching threshold.

In the next Step S22, it is determined whether the switching flag=1. In the case where the switching flag=1, the process proceeds to Step S24. In Step S24, it is determined whether the requested torque is the switching threshold or more and a previous value of the slip determination flag is "0". In the case where the conditions in Step S24 are satisfied, the process proceeds to Step S26, and the switching flag is set to "0". Thereby, rotation speed F/B control is performed while the motor rotation speed is set as the control subject.

On the other hand, in the case where the conditions in Step S24 are not satisfied, the process proceeds to Step S28, and the switching flag is set to "1". Thereby, rotation speed F/B control is performed while the wheel speed is set as the control subject. In the case where the slip determination flag (previous value) is "1" in Step S24, slip control has already been performed while the wheel speed has been set as the control subject. Therefore, switching of the control subject does not have to be performed, and rotation speed F/B control is performed while the wheel speed is set as the control subject. Thereby, it is possible to avoid torque variation due to switching of the control subject during the slip control.

In the case where the switching flag=0 in Step S22, the process proceeds to Step S30. In Step S30, it is determined whether the requested torque is less than the switching threshold and the previous value of the slip determination flag is "0". In the case where the conditions in Step S30 are satisfied, the process proceeds to Step S32, and the switching flag is set to "1". Thereby, rotation speed F/B control is performed while the wheel speed is set as the control subject.

On the other hand, in the case where the conditions in Step S30 are not satisfied, the process proceeds to Step S34, and the switching flag is set to "0". Thereby, rotation speed F/B control is performed while the motor rotation speed is set as the control subject. In the case where the slip determination flag is "1" in Step S30, slip control has already been performed while the motor rotation speed has been set as the control subject. Therefore, switching of the control subject does not have to be performed, and rotation speed F/B control is performed while the motor rotation speed is set as the control subject. Thereby, it is possible to avoid torque variation due to switching of the control subject during the slip control.

After Steps S26, S28, S32, and S34, the process proceeds to Step S36. In Step S36, it is determined whether the switching flag=1. In the case where the switching flag=1, the process proceeds to Step S38. In Step S38, an output value of the rotation speed is set to the wheel speed. Thereby, the wheel speed is transmitted as the rotation speed serving as the control subject from the feedback (F/B) signal switching module 104 to the slip determination module 106 and the rotation speed F/B control module 108.

In the next Step S40, a control gain of rotation speed F/B control is set to a control gain in the case where the control subject is the wheel speed (Gain_A).

In the case where the switching flag=0 in Step S36, the process proceeds to Step S42. In Step S42, an output value of the rotation speed is set to the motor rotation speed. Thereby, the motor rotation speed is transmitted as the rotation speed serving as the control subject from the feedback (F/B) signal switching module 104 to the slip determination module 106 and the rotation speed F/B control module 108.

In the next Step S44, the control gain of rotation speed F/B control is set to a control gain in the case where the control subject is the motor rotation speed (Gain_B). After Step S40 or S44, the process ends.

As described above, in the implementation, the rotation speed of the control subject is designated on the basis of the requested torque, and the wheel speed is set as the control subject in the case of low requested torque. Thereby, it is possible to surely suppress vibration in the motor rotation speed in the case where disturbance is input from a wheel. On the other hand, the motor rotation speed is set as the control subject in the case of high requested torque. Thereby, it is possible to improve responsiveness in slip control and surely suppress a slip.

On the other hand, even in the case where the control subject is changed on the basis of the requested torque, it may be erroneously determined that a slip is occurring although actually the slip is not occurring, when disturbance of an unexpected level is added to a wheel. In this case, a torque down amount calculated by the rotation speed feedback (F/B) control module 108 so that the rotation speed of the control subject becomes equal to the target rotation speed becomes too much, and the motor rotation speed may vibrate and diverge.

Accordingly, the torque limiting module 110 calculates a torque down limiting value in accordance with a requested torque, and limits the torque down amount from the requested torque. Thereby, it is possible to surely suppress divergence in the motor rotation speed even in the case where unexpected disturbance is added and erroneous slip determination happens. Therefore, it is possible to improve robustness while the slip suppression performance does not decrease.

Figure 7:
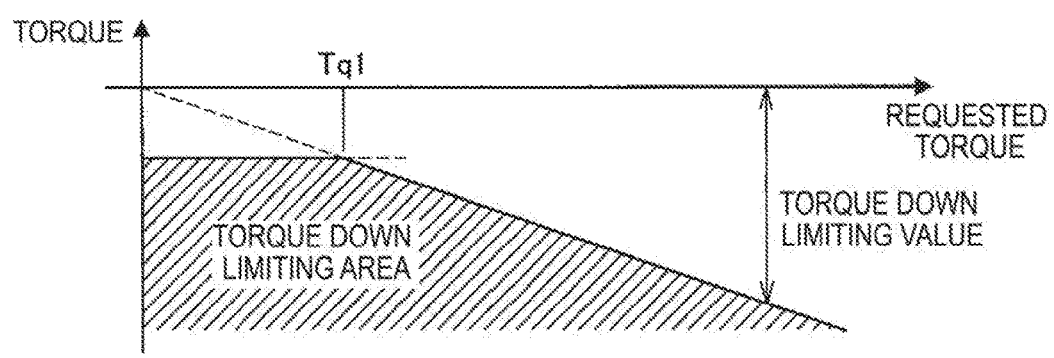
FIG. 7 is a schematic diagram illustrating a map by which a torque limiting module calculates a torque down limiting value according to a requested torque.

FIG. 7 is a schematic diagram illustrating a map by which the torque limiting module 110 calculates a torque down limiting value according to a requested torque. As illustrated in FIG. 7, the torque down limiting value (absolute value) becomes larger and the larger amount of torque is decreased as the requested torque increases.

The torque down limiting value (absolute value) becomes smaller as the requested torque decreases. In the case where the requested torque is a predetermined value (Tq1) or less, the torque down limiting value does not decrease further, and is kept at a torque down upper limit. Thereby, it is possible to secure controllability at the time when a slip is occurring in the case where a requested torque is very small such as the case where a vehicle travels on an extremely low friction road surface (for example, traveling on icy and snowy road, temporal jump of vehicle, or traveling on free roller).

In the case where a torque down amount calculated by the rotation speed feedback (F/B) control module 108 is smaller than a torque down limiting value (absolute value) illustrated in FIG. 7, the torque limiting module 110 decreases a requested torque by the torque down amount calculated by the rotation speed feedback (F/B) control module 108, and outputs this result as a torque ordering value to a motor of each wheel.

On the other hand, in the case where a torque down amount calculated by the rotation speed feedback (F/B) control module 108 is larger than the torque down limiting value (absolute value) illustrated in FIG. 7, the torque limiting module 110 decreases a requested torque by the torque down limiting value (absolute value) illustrated in FIG. 7, and outputs this result as a torque ordering value to a motor of each wheel.

FIG. 7 illustrates torque down limiting values at the time of powering, and illustrates lower limits of torque down amounts. At the time of regeneration, the rotation speed feedback (F/B) control module 108 calculates a torque addition amount. Therefore, it is preferable to set an upper limit on the torque addition amount in a similar way.

Figure 8:
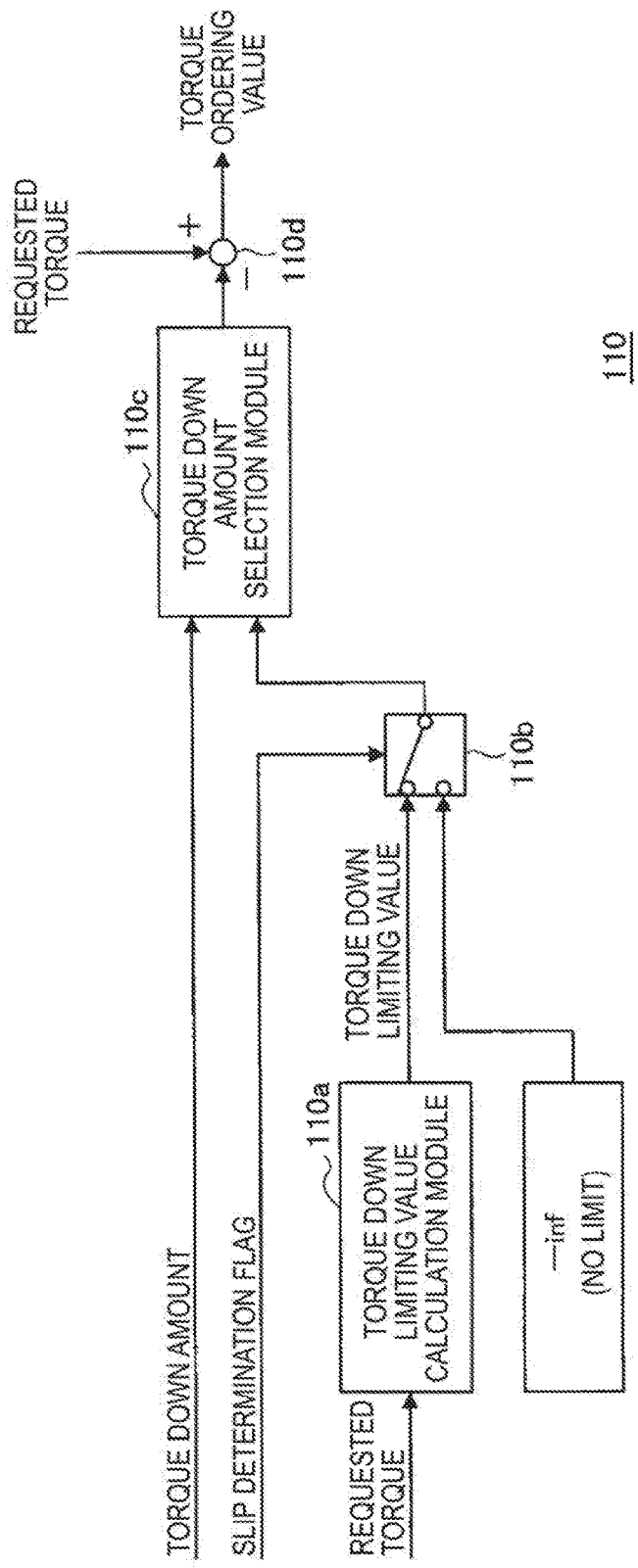
FIG. 8 is a schematic diagram illustrating a configuration of a torque limiting module.

FIG. 8 is a schematic diagram illustrating a configuration of the torque limiting module 110. As illustrated in FIG. 8, the torque limiting module 110 includes a torque down limiting value calculation module 110a, a switch 110b, a torque down amount selection module 110c, and a subtraction module 110d. The torque down limiting value calculation module 110a calculates a torque down limiting value from a requested torque on the basis of the map in FIG. 7. The torque down limiting value is transmitted to the switch 110b. In the case where it is determined that a slip is occurring on the basis of the slip determination flag, the switch 110b transmits the torque down limiting value to the torque down amount selection module 110c.

The torque down amount selection module 110c receives a torque down amount calculated by the rotation speed feedback (F/B) control module 108. The torque down amount selection module 110c selects one having a smaller value among the torque down amount calculated by the rotation speed feedback (F/B) control module 108 and the torque down limiting value calculated by the torque down limiting value calculation module 110a, and transmits it to the subtraction module 110d. The subtraction module 110d subtracts, from the requested torque, one having a smaller value among the torque down amount calculated by the rotation speed feedback (F/B) control module 108 and the torque down limiting value calculated by the torque down limiting value calculation module 110a, and outputs the requested torque after the subtraction as the torque ordering value. The motors of the front and rear wheels are controlled on the basis of the torque ordering value.

Figure 9:
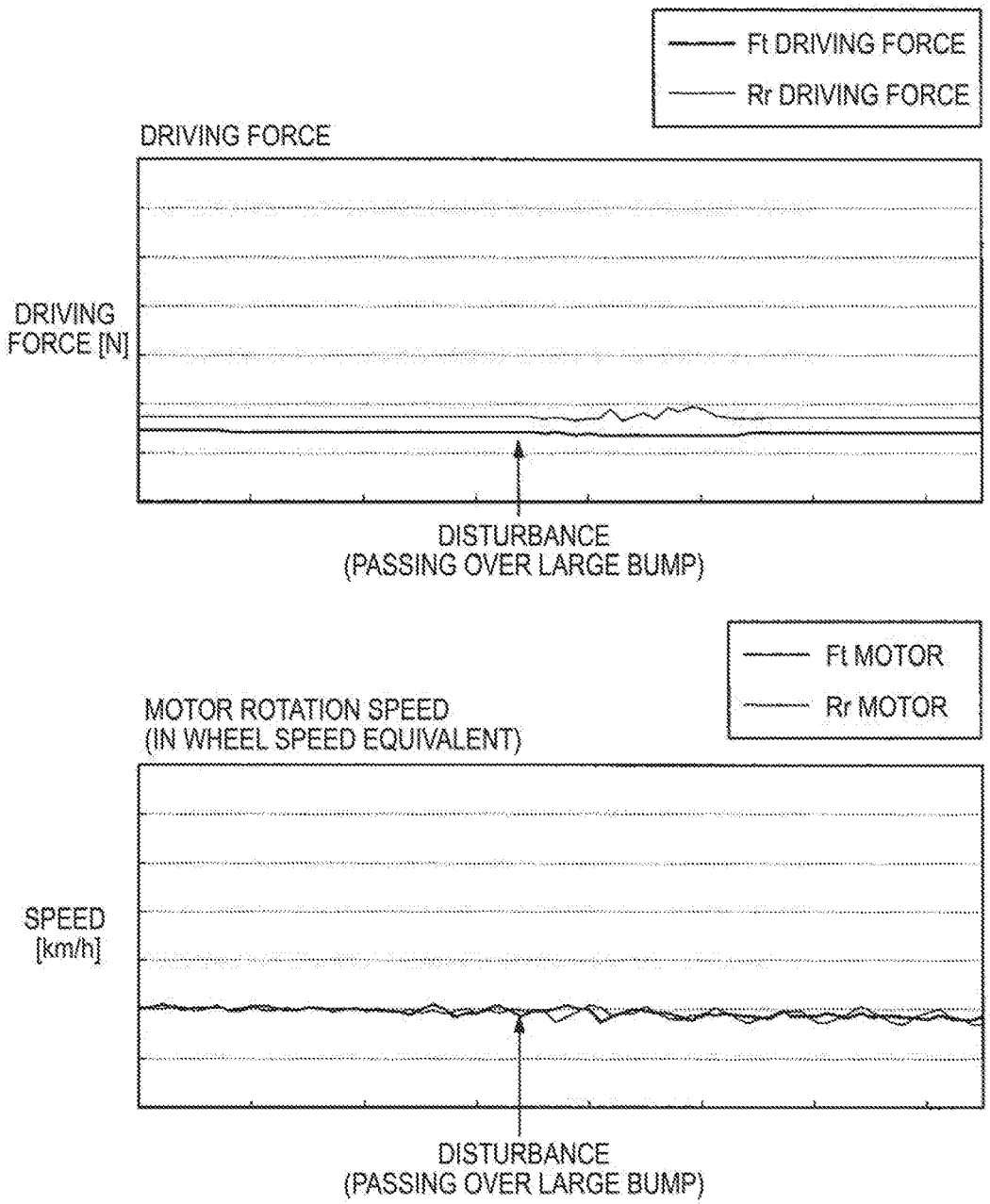
FIG. 9 is characteristic diagrams illustrating effects obtained by control according to the implementation.
Figure 10:
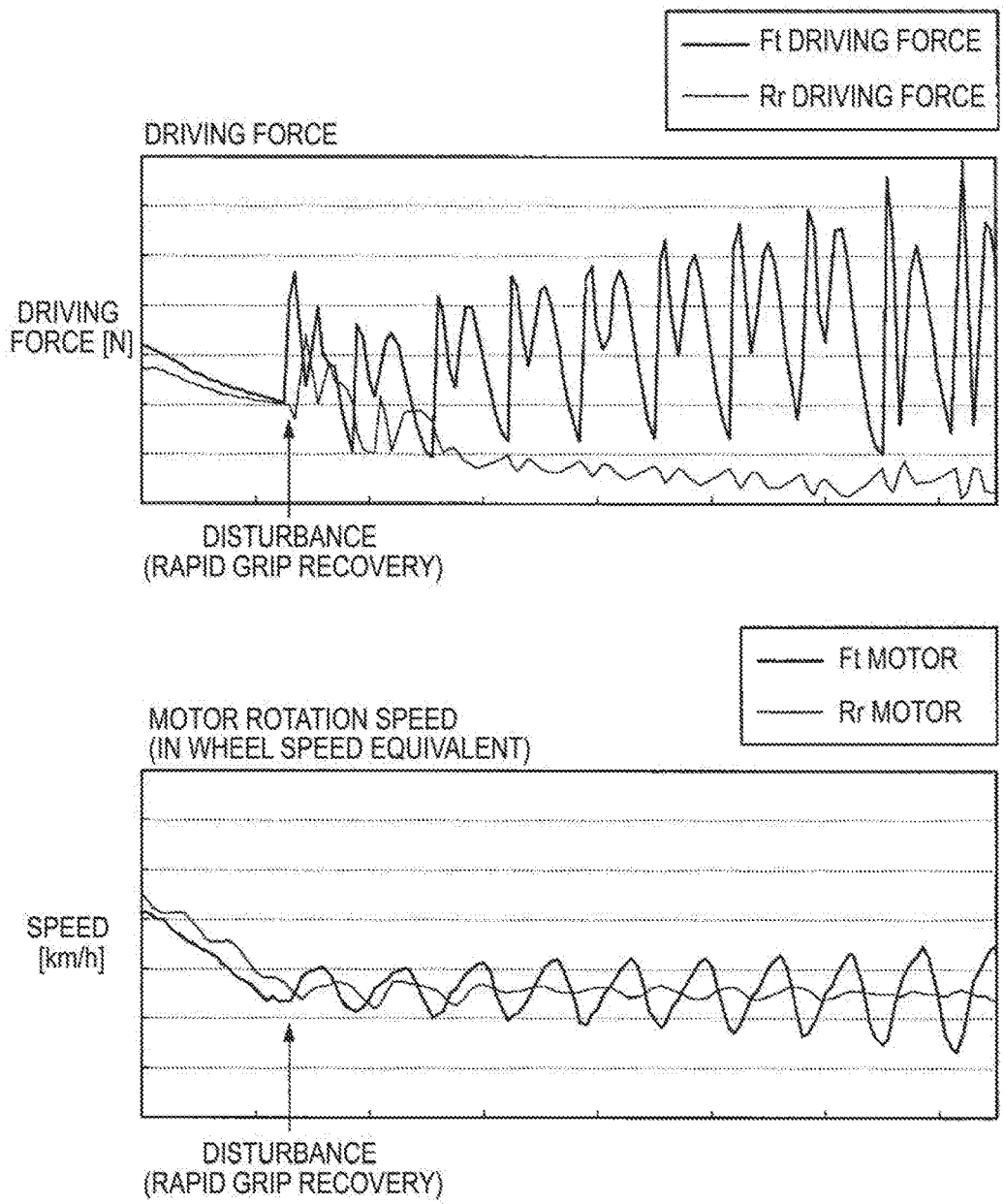
FIG. 10 is characteristic diagrams illustrating effects obtained by control according to the implementation.

FIG. 9 and FIG. 10 are characteristic diagrams illustrating effects obtained by control according to the implementation. FIG. 9 illustrates characteristics (motor driving force and motor rotation speed (in wheel speed equivalent)) in the case where the control according to the implementation is performed. For comparison, FIG. 10 illustrates characteristics (motor driving force and motor rotation speed (in wheel speed equivalent)) in the case where the control according to the implementation is not performed.

As illustrated in FIG. 9, in the case where the control according to the implementation is performed, torque change in motor driving force of the front wheels (Ft driving force) and motor driving force of the rear wheels (Rr driving force) is suppressed and torque does not diverge, although a vehicle has passed over a large bump serving as disturbance during traveling. In addition, the motor rotation speed in wheel speed equivalent does not change drastically after passing over the bump. This means that stable vehicle behavior can be obtained even in the case where disturbance occurs.

On the other hand, in FIG. 10, motor driving force of the front wheels (Ft driving force) and motor driving force of the rear wheels (Rr driving force) change drastically after rapid grip recovery is performed as disturbance, and a torque diverges. Also with respect to the motor rotation speed in wheel speed equivalent, the motor rotation speed diverges after grip recovery. This means that vehicle behavior becomes unstable.

As described above, in the implementation, the rotation speed feedback control is performed by switching the control subject between the wheel speed and the motor rotation speed in accordance with a level of a requested torque. Therefore, it is possible to improve responsiveness in slip control and surely suppress vibration due to torsion of a drive shaft. In addition, by limiting a torque down amount in slip control (rotation speed F/B control) in accordance with a level of a requested torque, it is possible to surely suppress vibration in the motor rotation speed even in the case where disturbance more than expectation is input to a wheel. Therefore, it is possible to improve robustness in slip control.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle control device comprising:
   a requested torque acquisition module that acquires a requested torque requested to a motor that drives a wheel;
   a control subject designation module that:
      designates a motor rotation speed as a control subject in a case where the requested torque is a predetermined threshold or more; and
      designates a wheel speed as the control subject in a case where the requested torque is less than the predetermined threshold; and
   a control module that performs feedback control in a manner that the designated control subject becomes equal to a target value.

2. The vehicle control device according to claim 1, comprising a slip determination module that determines a slip of the wheel on the basis of a comparison result between the target value and the designated control subject,
   wherein the control module performs the feedback control in a case where the slip determination module determines that the slip is occurring.

3. The vehicle control device according to claim 2, wherein, while the slip determination module is determining that the slip is occurring, the control module does not switch the control subject in accordance with the designation of the control subject.

4. The vehicle control device according to claim 1, further comprising a slip determination module that determines a slip of the wheel,
   wherein, while the slip determination module is determining that the slip is occurring, the control module does not switch the control subject in accordance with the designation of the control subject.

5. The vehicle control device according to claim 1, wherein the control module performs the feedback control on the basis of a control gain according to the designated control subject.

6. The vehicle control device according to claim 2, wherein the control module performs the feedback control on the basis of a control gain according to the designated control subject.

7. The vehicle control device according to claim 1,
   wherein the control module calculates a torque down amount of the motor so as to make the designated control subject equal to the target value, and
   wherein the vehicle control device further includes a torque limiting module that limits the torque down amount on the basis of the requested torque.

8. The vehicle control device according to claim 2,
   wherein the control module calculates a torque down amount of the motor so as to make the designated control subject equal to the target value, and
   wherein the vehicle control device further includes a torque limiting module that limits the torque down amount on the basis of the requested torque.

9. The vehicle control device according to claim 7, wherein the torque limiting module limits the torque down amount in a manner that the torque down amount becomes smaller as the requested torque decreases.

10. The vehicle control device according to claim 8, wherein the torque limiting module limits the torque down amount in a manner that the torque down amount becomes smaller as the requested torque decreases.

11. The vehicle control device according to claim 9, wherein the torque limiting module sets the torque down amount to a constant value regardless of the requested torque in a case where the requested torque is a predetermined value or less.

12. The vehicle control device according to claim 10, wherein the torque limiting module sets the torque down amount to a constant value regardless of the requested torque in a case where the requested torque is a predetermined value or less.

13. A vehicle control method comprising:
    acquiring a requested torque requested by a driver;
    designating a motor rotation speed as a control subject in a cash where the requested torque is a predetermined threshold or more;
    designating a wheel speed as the control subject in a case where the requested torque is less than the predetermined threshold; and
    performing feedback control in a manner that the designated control subject becomes equal to a target value.

14. A vehicle control device comprising:
    circuitry configured to:
      acquire a requested torque requested to a motor that drives a wheel;
      designate a motor rotation speed as a control subject in a case where the requested torque is a predetermined threshold or more;
      designate a wheel speed as the control subject in a case where the requested torque is less than the predetermined threshold; and
      perform feedback control in a manner that the designated control subject becomes equal to a target value.

15. A vehicle control device comprising:
    a requested torque acquisition module that acquires a requested torque requested to a motor that drives a wheel;
    a control subject designation module that designates one of a wheel speed and a motor rotation speed as a control subject on the basis of the requested torque;
    a slip determination module that determines a slip of the wheel on the basis of a comparison result between a target value and the designated control subject; and
    a control module that performs, in a case where the slip determination module determines that the slip is occurring, feedback control in a manner that the designated control subject becomes equal to the target value.

* * * * *